United States Patent
Chuang et al.

(10) Patent No.: US 11,373,391 B2
(45) Date of Patent: Jun. 28, 2022

(54) IMAGE PROCESSING DEVICE, IMAGE PROCESSING SYSTEM AND IMAGE PROCESSING METHOD

(71) Applicant: Novatek Microelectronics Corp., Hsinchu (TW)

(72) Inventors: Hung-Chang Chuang, Kaohsiung (TW); Chaohsu Hsu, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 59 days.

(21) Appl. No.: 16/984,159

(22) Filed: Aug. 4, 2020

(65) Prior Publication Data

US 2021/0287033 A1    Sep. 16, 2021

Related U.S. Application Data

(60) Provisional application No. 62/990,425, filed on Mar. 16, 2020.

(51) Int. Cl.
*G06T 5/00* (2006.01)
*G06V 10/30* (2022.01)
(Continued)

(52) U.S. Cl.
CPC .............. *G06V 10/30* (2022.01); *G06T 5/002* (2013.01); *G06V 10/56* (2022.01); *G06V 20/52* (2022.01);
(Continued)

(58) Field of Classification Search
CPC .... G06K 9/40; G06K 9/00771; G06K 9/4652; G06T 5/002; G06T 2207/20182; G06T 2207/20192
(Continued)

(56) References Cited

U.S. PATENT DOCUMENTS

2006/0114520 A1* 6/2006 Enomoto ........... H04N 1/00188
                                                  358/448
2007/0229912 A1* 10/2007 Matsushita ........ H04N 1/00347
                                                  358/448
(Continued)

FOREIGN PATENT DOCUMENTS

WO    2019008936    1/2019

OTHER PUBLICATIONS

"Office Action of Taiwan Counterpart Application", dated Mar. 9, 2022, p. 1-p. 9.

*Primary Examiner* — Ali Bayat
(74) *Attorney, Agent, or Firm* — JCIPRNET

(57) ABSTRACT

An image processing device determining image adjustment parameters in real time so as to facilitate modifying the image adjustment parameters includes an image input device acquiring an original image signal and output a first image signal; a parameter adjustment device modifying image adjustment parameters; an image processing circuit receiving the first image signal and the image adjustment parameters and adjusting the first image signal according to the image adjustment parameters to output a second image signal; an information label circuit coupling to the image processing circuit and receiving the second image signal and internal information of the image processing circuit and labeling at least one part of the second image signal according to the internal information to generate a labeled output image; and an image output device coupling to the information label circuit and outputting the labeled output image having at least one label indicating the internal information.

24 Claims, 5 Drawing Sheets

(51) Int. Cl.
*G06V 10/56* (2022.01)
*G06V 20/52* (2022.01)

(52) U.S. Cl.
CPC ............... *G06T 2207/20182* (2013.01); *G06T 2207/20192* (2013.01)

(58) Field of Classification Search
USPC ......................................................... 382/103
See application file for complete search history.

(56) References Cited

U.S. PATENT DOCUMENTS

| | | | |
|---|---|---|---|
| 2009/0237686 A1* | 9/2009 | Yoshida | H04N 1/32598 358/1.9 |
| 2010/0238313 A1* | 9/2010 | Ohki | G06T 3/40 348/222.1 |
| 2012/0281905 A1* | 11/2012 | Cheng | H04N 13/106 382/154 |
| 2017/0004752 A1* | 1/2017 | Hasegawa | H04N 1/4095 |
| 2017/0039776 A1 | 2/2017 | Endo et al. | |
| 2018/0130181 A1* | 5/2018 | Taketani | G06T 15/30 |
| 2018/0149322 A1* | 5/2018 | Tada | G09G 3/3413 |
| 2020/0134873 A1 | 4/2020 | Umemura et al. | |

* cited by examiner

IMAGE PROCESSING DEVICE, IMAGE PROCESSING SYSTEM AND IMAGE PROCESSING METHOD

CROSS-REFERENCE TO RELATED APPLICATION

This application claims the priority benefit of U.S. provisional application Ser. No. 62/990,425, filed on Mar. 16, 2020. The entirety of each of the above-mentioned patent applications is hereby incorporated by reference herein and made a part of this specification.

BACKGROUND

Technical Field

The disclosure relates to an image processing device, an image processing system and an image processing method.

Description of Related Art

Image quality of an object acquiring from an image system may depend on an environmental condition of the object, for example, the image quality of the object may become lower as the lightness of the environment becomes lower. A typical image processing method to improve the image quality in the above condition is to use an image processing unit (for example, spatial-temporal filter) to filter noise of the image.

However, proper image adjustment parameters of the image processing unit to effectively filter the noise of the image may not be determined. An operator can only judge whether each parameter is appropriate according to the final effect. For example, it is not obvious whether a moving area is not well judged or the moving area is filtered too much when the image of the moving area is blurred, which often results in the use of wrong filter in specific pixels. The side effect of using the wrong filter is that there are unexpected images in the video or the noise cannot be eliminated significantly. As image processing algorithms become more complex, it becomes more difficult to adjust the parameters only according to the final effect.

Nothing herein should be construed as an admission of knowledge in the prior art of any portion of the present disclosure.

SUMMARY

An image processing device, an image processing system and an image processing method determining image adjustment parameters in real time are introduced.

In an embodiment of the disclosure, the image processing device includes an image processing circuit, configured to receive a first image signal and image adjustment parameters and process the first image signal according to the image adjustment parameters to output a second image signal; and an information label circuit, coupled to the image processing circuit, and configured to receive the second image signal and internal information of the image processing circuit and label at least one part of the second image signal according to the internal information to generate a labeled output image having at least one label indicating the internal information for demonstrating in real time an adjustment result produced by the image adjustment parameters so as to facilitate modifying the image adjustment parameters.

In an embodiment of the disclosure, the image processing system includes an image input device, configured to acquire an original image signal and output a first image signal; a parameter adjustment device, configured to modify image adjustment parameters; an image processing device, configured to receive the first image signal and the image adjustment parameters and process the first image signal according to the image adjustment parameters to generate a labeled output image for demonstrating in real time an adjustment result produced by the image adjustment parameters so as to facilitate modifying the image adjustment parameters; and an image output device, coupled to the information label circuit and configured to output the labeled output image having at least one label indicating internal information of the image processing device.

In an embodiment of the disclosure, the image processing method includes receiving a first image signal and image adjustment parameters and processing the first image signal by an image processing circuit according to the image adjustment parameters to output a second image signal; and receiving the second image signal and internal information of the image processing circuit and labeling at least one part of the second image signal according to the internal information to generate a labeled output image having at least one label indicating the internal information for demonstrating in real time an adjustment result produced by the image adjustment parameters so as to facilitate modifying the image adjustment parameters.

To sum up, the image processing device, the image processing system and the image processing method provided by the disclosure facilitate modifying the image adjustment parameters to enhance the image quality.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments of the disclosure are described hereinafter with reference to the drawings.

Figure 1:
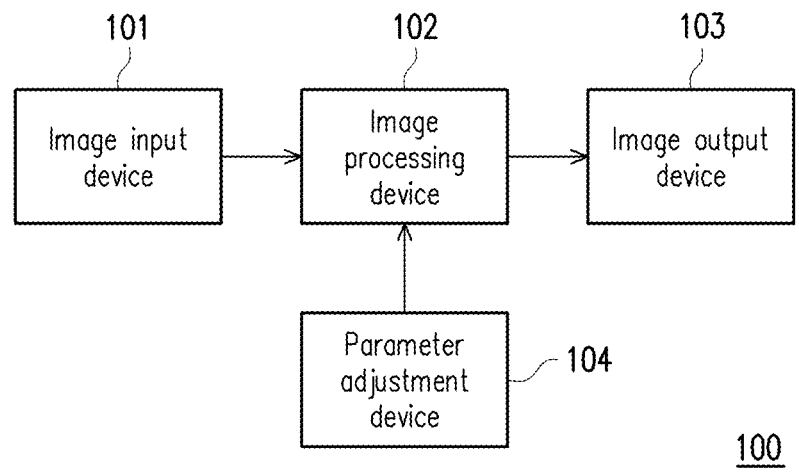
FIG. 1 is an image processing system according to an embodiment of the disclosure.

FIG. 1 is an image processing system 100 according to an embodiment of the disclosure. The image processing system 100 includes an image input device 101, an image processing device 102, an image output device 103 and a parameter adjustment device 104. The image input device 101 may include an image sensor or an image reading device acquiring an original image signal from the image sensor or a storage device and outputs a first image signal to the image processing device 102. The image processing device 102 receives the first image signal and adjusts the first image signal according to image adjustment parameters from the parameter adjustment device 104 and outputs a labeled output image. The image output device 103 receives and outputs the labeled output image.

After the image adjustment parameters are modified, the internal operation state or status or setting of the image processing device 102 is modified, which may further produce the second image signal having different labels indicating different internal information.

The image output device 103 can demonstrate the labeled output image in real time to a user of the image processing system 100, thereby showing an adjustment result produced by the image adjustment parameters so as to facilitate the user to modify the image adjustment parameters. In other words, different values of the image adjustment parameters may cause different labels on the labeled output image. The user can watch the labeled output image having different labels to observe different adjustment effects generated by different values of the image adjustment parameters. Since different labels (having different observable indications) for different categories (for example, different moving states, different edge strengths), the user can more easily judge a reason for an unsatisfying image. For example, the user may more easily judge whether a moving area for a burry moving region is bad judgement for a covered region for the moving area or an over-strong filter associated with the moving region.

Accordingly, the user having more knowledge about the output image may make more appropriate modifications to the image adjustment parameters In other words, the user can then modify the values of the image adjustment parameters according to the user's observation such that the labeled output image generated according to the modified values of the image adjustment parameters can more meet the user's requirements. The final values of the image adjustment parameters determined by the user in a calibration mode can be stored in a storage device such that in a normal mode, the image processing device 102 can operate according to the final values of the image adjustment parameters.

Figure 2:
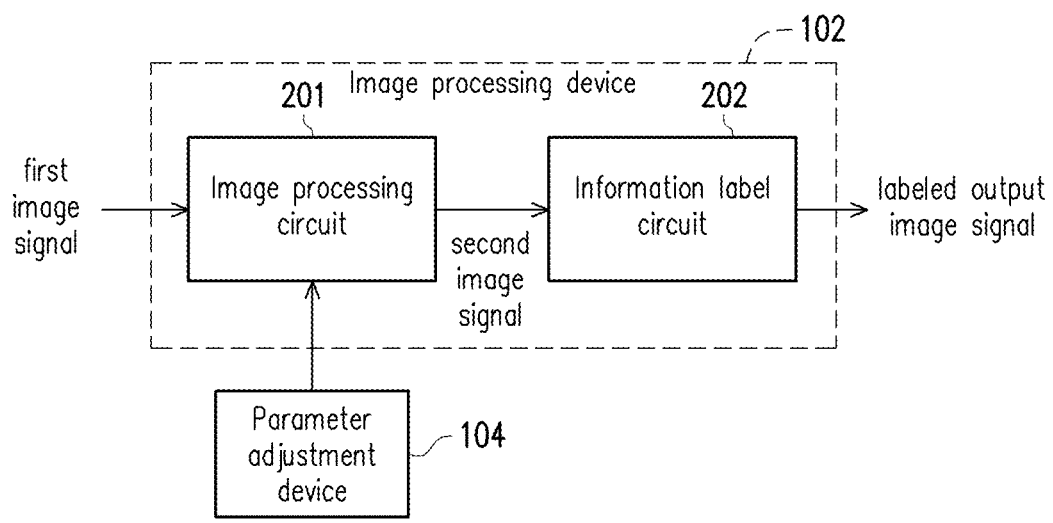
FIG. 2 is an image processing device according to an embodiment of the disclosure.

FIG. 2 is a signal flow of the image processing device 102 according to an embodiment of the disclosure. The image processing device 102 includes an image processing circuit 201 and an information label circuit 202. The image processing circuit 201 receives the first image signal and the image adjustment parameters and adjusts the first image signal according to the image adjustment parameters to output a second image signal. The information label circuit 202 receives the second image signal and internal information of the image processing circuit 201 and labels at least one part of the second image signal according to the internal information to generate the labeled output image for demonstrating in real time the adjustment result produced by the image adjustment parameters so as to facilitate modifying the image adjustment parameters. The parameter adjustment device 104 is configured to modify the image adjustment parameters according to which the image processing circuit 201 process the first image signal. After the image adjustment parameters are modified, the internal operation state or status or setting of the image processing circuit 201 is modified, which may further produce the second image signal having different labels indicating different internal information.

The final values of the image adjustment parameters determined by the user in a calibration mode can be stored in a storage device such that in a normal mode, the image processing device 102 can operate according to the final values of the image adjustment parameters.

The image processing circuit 201 may categorize the at least one part of the second image signal into different categories and the internal information indicates a result of the categorization, and a label generation unit 602 of the information label circuit 202 is configured to generate different labels for the different categories according to the internal information. The different labels for the different categories may enable the user or operator to have more observation on the adjustment result of the image adjustment parameters. For example, different labels may have different colors or any observable indications for the different categories.

The at least one part of the second image signal comprises a first part belong to a first category among the different categories and a second part belong to a second category among the different categories, and an overlaying unit 603 of the information label circuit 202 can be configured to overlay the first part with a first label indicating the first category and overlay the second part with a second label indicating the second category.

As an example, the image processing circuit 201 include a spatial-temporal filter configured 404 to filter the first image signal according to the image adjustment parameters. The different categories may correspond to different moving conditions, wherein the different moving conditions may comprise at least one of a still state, a moving state and a transition state. The labels may therefore have a first color (or any first indication), a second color (or any second indication) and a third color respectively (or any third indication) for a still state, a moving state and a transition state.

As an example, the image processing circuit 201 include an edge enhancement unit 403 or a sharpening unit configured to enhance or sharpen edges of the first image signal according to the image adjustment parameters. The different categories correspond to different edge strengths. The labels may therefore have a first color (or any first indication) and second color (or any second indication) respectively for a first edge strength and a second edge strength and so on.

Figure 3A:
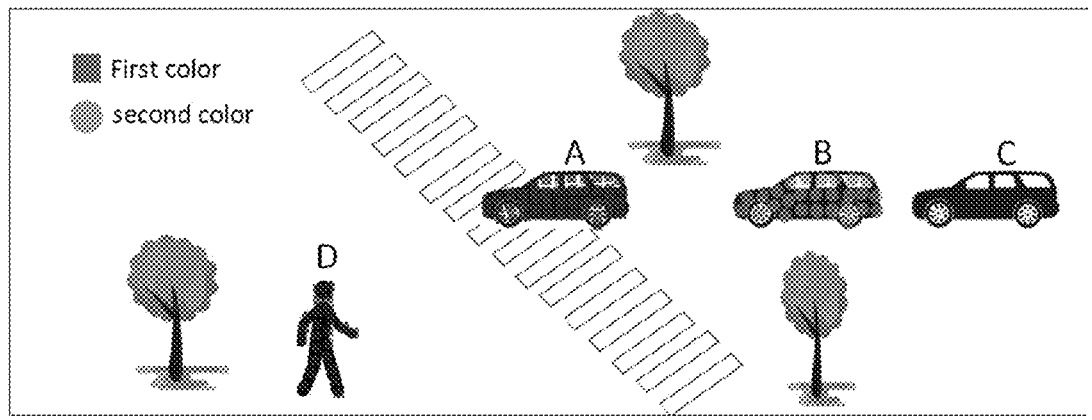
FIG. 3A~FIG. 3C are three labeled output images according to an embodiment of the disclosure.
Figure 3B:
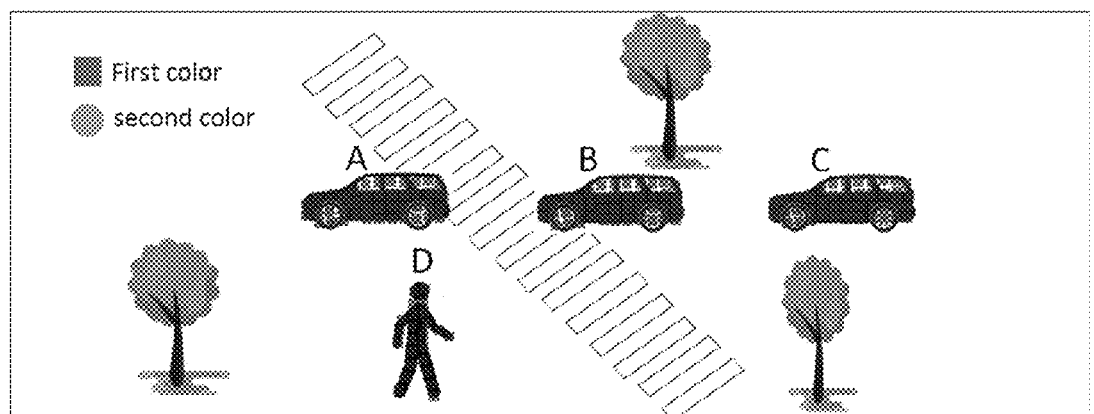

FIG. 3A and FIG. 3B are two labeled output images according to an embodiment of the disclosure. FIG. 3A and FIG. 3B are street view images. In FIG. 3A, the street view image is in a first time, a first car (A) moving and going to pass the zebra crossing is in a moving state and the first car (A) is labeled with a first color (or line width, line type). A second car (B) and a third car (C) are behind the first car (A), and the second car (B) starting to move is in a transition state and labeled with a second color (or line width, line type). A person (D) of FIG. 3A is walking (i.e. in the moving state) and labeled with the first color. In FIG. 3B, the street view image is in a second time later than the first time, both the three cars (A, B, C) and the person (D) are in the moving state and labeled with the first color.

Figure 3C:
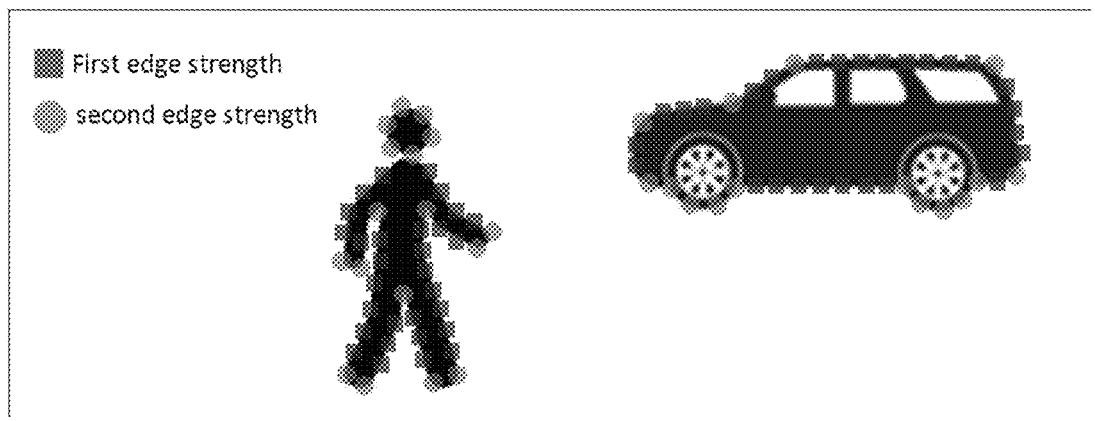

Different objects in FIG. 3C may be categorized into different categories according to their edge strengths and labeled with different edge strength corresponding to the different categories. For example, objects with edge strength less than a first threshold value, which is a parameter set in the image processing device 102, may be labeled with a first edge strength, and objects with edge strength equal to or greater than the first threshold value may be labeled with a second edge strength.

An operator or user may judge an adjustment result of the image adjustment parameters in real time by observing the labeled output images having different labels corresponding to different values of the image adjustment parameters so as to facilitate modifying the image adjustment parameters.

Referring to FIG. 2 and FIGS. 3A-3C, the internal information of the image processing circuit 201 indicates a result of the categorization mentioned in FIGS. 3A and 3C, for example, when the image processing circuit 201 comprises the spatial-temporal filter 404 configured to filter the first image signal according to the image adjustment parameters, the different categories correspond to different moving conditions, wherein the different moving conditions comprise at least one of a still state, a moving state and a transition state. When the image processing circuit 201 comprises the edge enhancement unit 403 or the sharpening unit configured to enhance or sharpen edges of the first image signal according to the image adjustment parameters, the different categories correspond to different edge strengths.

Figure 4:
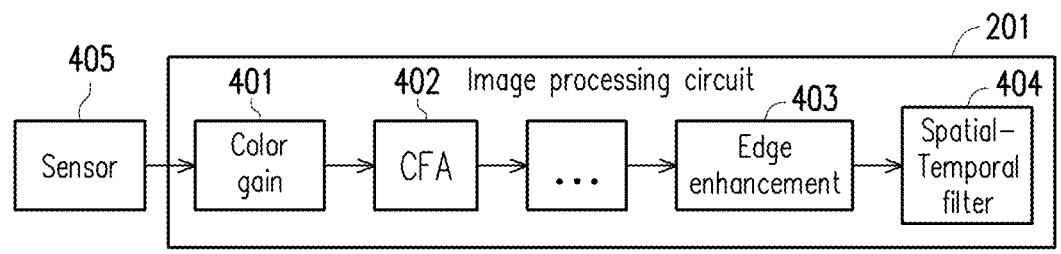
FIG. 4 is a signal flow of the image processing device according to an embodiment of the disclosure.

FIG. 4 is an image processing circuit 201 according to an embodiment of the disclosure. The CFA 402 in FIG. 4 represents a color filter array. The first image signal received by the image processing circuit 201 is processed by at least one of a series of function blocks (i.e. color gain 401, CFA 402, edge enhancement unit 403, and spatial-temporal filter 404) to obtain an improved image signal comparing to the original image signal acquired from the image sensor 405 or the storage device. In other words, the image adjustment parameters provided by the parameter adjustment device 104 can be used by either or more of the function blocks to process the image input device 101 (e.g., the image sensor 405).

Figure 5:
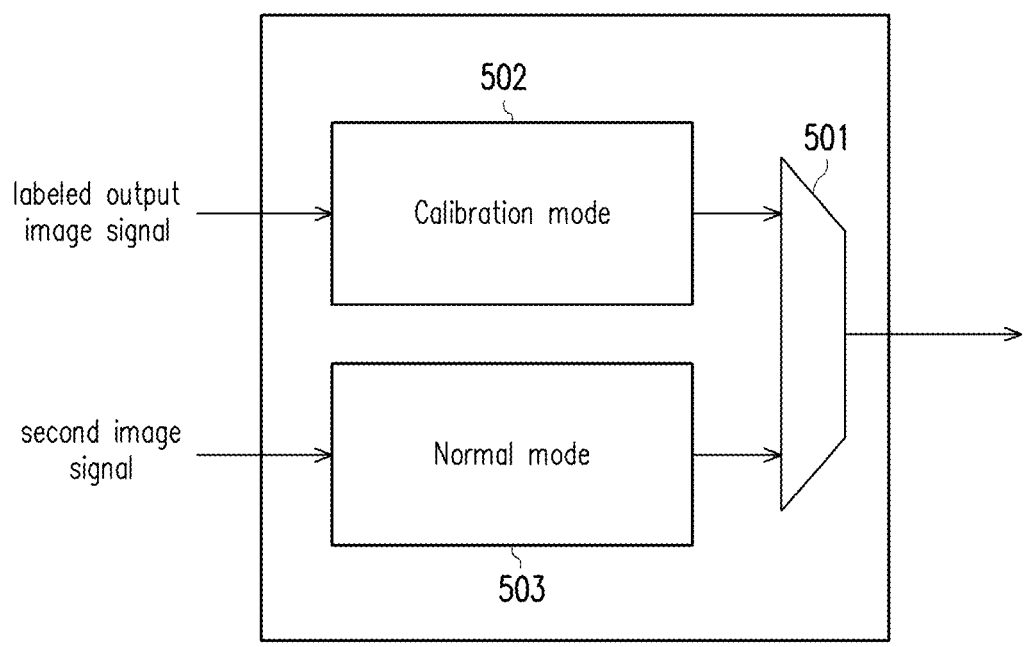
FIG. 5 is a signal flow of different modes according to an embodiment of the disclosure.

FIG. 5 is a signal flow of different modes according to an embodiment of the disclosure. The information label circuit 202 further includes a multiplexer circuit 501 configured to receive the labeled output image and the second image signal and output the labeled output image or the second image signal according to a mode selection signal. In a calibration mode 502, the multiplexer circuit 501 can output the labeled output image signal. In a normal mode 503, the multiplexer circuit 501 can directly output the second image signal without labels.

Figure 6:
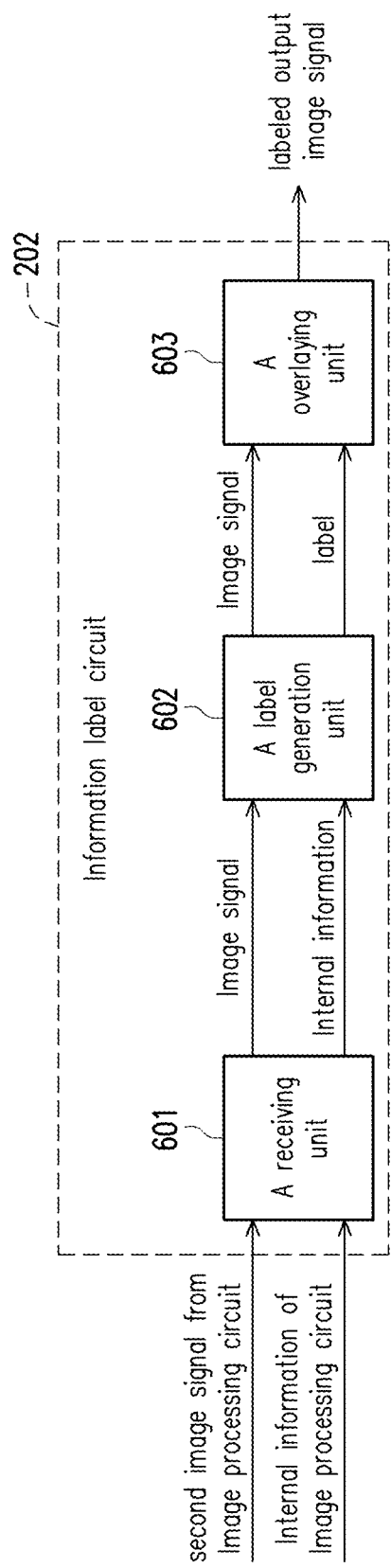
FIG. 6 is a signal flow of an information label circuit according to an embodiment of the disclosure.

FIG. 6 is a signal flow of an information label circuit 202 according to an embodiment of the disclosure. The information label circuit 202 includes a receiving unit 601 configured to receive the second image signal and the internal information of the image processing circuit 201, a label generation unit 602 configured to generate at least one label according to the second image signal and the internal information of the image processing circuit 201 and an overlaying unit 603 configured to overlay the at least one part of the second image signal with the at least one label to generate the labeled output image.

In some embodiments, the label generation unit 602 can generate different labels overlaying the second image signal by modifying a U value and a V value of the second image signal to different values according to different values of the internal information while maintaining a Y value of the second image signal.

In some alternative embodiments, the overlaying unit 603 generate different labels overlaying the second image signal by modifying a Y value of the second image signal to different values according to different values of the internal information while modifying each of a U value and V value of the second image signal to a predetermined value (such as 128 for an 8 bit signal).

As an example, the label generation unit 602 generates different colors as the at least one label according to different moving conditions (i.e. different categories) of the at least one part of the second image signal. This may occur when the image processing circuit 201 includes the spatial-temporal filter 404. The overlaying unit 603 may overlays a first part of the at least one part of the second image signal having a moving condition 1 (i.e. moving state) with the first color by modifying a U value and a V value of the second image signal to a first predetermined value respectively while maintaining a Y value of the second image signal. Additionally or alternatively, the overlaying unit 603 may overlay a second part of the at least one part of the second image signal having a moving condition 2 (i.e. transition state) with the second color by modifying the U value and the V value of the second image signal to a second predetermined value respectively while maintaining the Y value of the second image signal.

As another example, the label generation unit 602 generates different colors as the at least one label according to different edge strengths (i.e. different categories) of the at least one part of the second image signal. This may occur when the image processing circuit 201 includes the edge enhancement unit 403 or the sharpening unit. The overlaying unit 603 may overlay a first part of the at least one part of the second image signal having a first edge strength with the first color by modifying a U value and a V value of the second image signal to a first predetermined value respectively while maintaining a Y value of the second image signal. Additionally or alternatively, the overlaying unit 603 may overlay a second part of the at least one part of the second image signal having a second edge strength with the second color by modifying the U value and the V value of the second image signal to a second predetermined value respectively while maintaining the Y value of the second image signal.

The overlaying unit 603 may also overlay the at least one part of the second image signal with different colors by modifying a R value, a G value and a B value of the second image signal to a predetermined value, respectively. For example, for an 8-bit image signal, each of the R value, G value and B value can be modified to be 255. The label generation unit 602 may also generate different line widths or line types as the at least one label.

Figure 7:
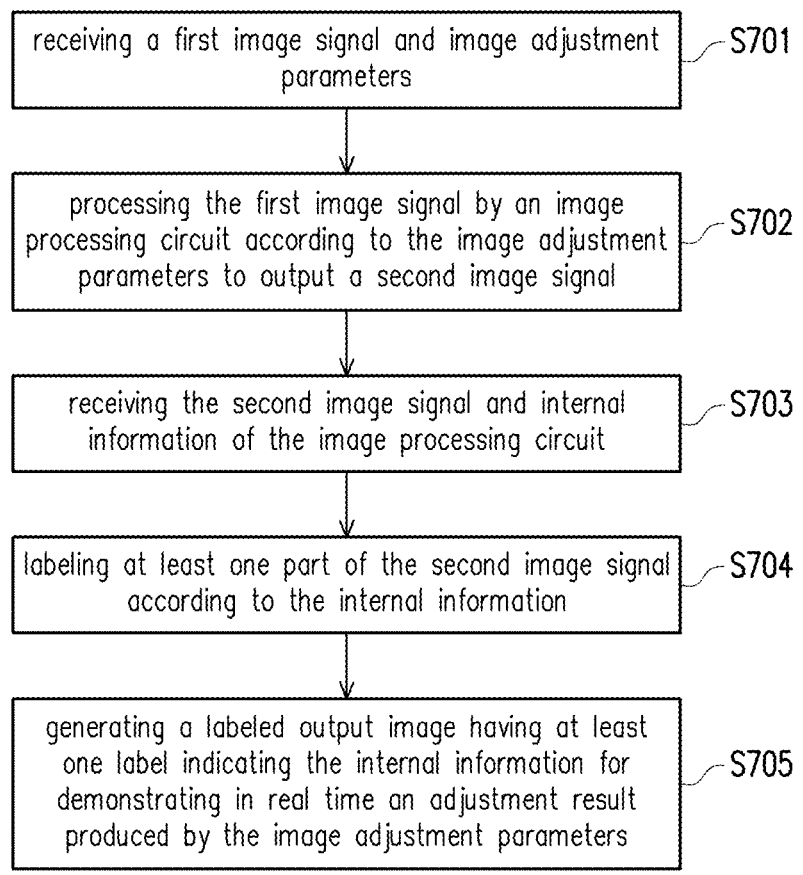
FIG. 7 is a flowchart of the image processing method according to an embodiment of the disclosure.

FIG. 7 is a flowchart of the image processing method according to an embodiment of the disclosure. The image processing method can be performed by the image processing device in the above embodiments but are not limited thereto. The image processing method can be performed in a calibration mode of the image processing device. The image processing method includes receiving a first image signal and image adjustment parameters (S701), processing the first image signal by an image processing circuit according to the image adjustment parameters to output a second image signal (S702), receiving the second image signal and internal information of the image processing circuit (S703), labeling at least one part of the second image signal according to the internal information (S704), generating a labeled output image having at least one label indicating the internal information for demonstrating in real time an adjustment result produced by the image adjustment parameters (S705) to as to facilitate a user or operator of the image processing device to determine final image adjustment parameters. By watching the labels having observable features/characteristics which can indicate the internal information (such as different blocks within the image processing circuit), the user or operator can better judge reasons causing undesired images and make better adjustment to improve image qualities. The final image adjustment parameters determined or desired by the user or operator can be then stored in a storage device and accessed by the image processing device to process image data and/or display images based on the final image adjustment parameters in a normal mode. Details of each step can be analogized from the descriptions in the other embodiments and thus omitted here for brevity.

To sum up, the image processing device, the image processing system and the image processing method provided by the disclosure facilitate modifying the image adjustment parameters to enhance the image quality.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image processing device, comprising:
    an image processing circuit, configured to receive a first image signal and image adjustment parameters and process the first image signal according to the image adjustment parameters to output a second image signal; and
    an information label circuit, coupled to the image processing circuit, and configured to receive the second image signal and internal information of the image processing circuit and label at least one part of the second image signal according to the internal information to generate a labeled output image having different labels indicating the internal information for demonstrating in real time an adjustment result produced by the image adjustment parameters so as to facilitate modifying the image adjustment parameters,
    wherein the image processing circuit is further configured to categorize the at least one part of the second image signal into different categories, and the different categories is distinguished with each other by using the different labels of the labeled output image.

2. The image processing device as claimed in claim 1, wherein the information label circuit comprises:
    a receiving circuit, configured to receive the second image signal and the internal information of the image processing circuit;
    a label generation circuit, configured to generate the different labels according to the second image signal and the internal information of the image processing circuit; and
    an overlaying circuit, configured to overlay the at least one part of the second image signal with the different labels to generate the labeled output image.

3. The image processing device as claimed in claim 2, wherein the internal information indicates a result of the categorization, and the label generation circuit is configured to generate different labels for the different categories according to the internal information.

4. The image processing device as claimed in claim 3, wherein the different labels have different colors for the different categories.

5. The image processing device as claimed in claim 2, wherein the at least one part of the second image signal comprises a first part belong to a first category among the different categories and a second part belong to a second category among the different categories, and the overlaying circuit is configure to overlay the first part with a first label indicating the first category and overlay the second part with a second label indicating the second category.

6. The image processing device as claimed in claim 2, wherein the image processing circuit comprises a spatial-temporal filter configured to filter the first image signal according to the image adjustment parameters.

7. The image processing device as claimed in claim 6, wherein the label generation circuit is configured to generate the different labels for the different categories according to the internal information and the different categories correspond to different moving conditions, wherein the different moving conditions comprise at least one of a still state, a moving state and a transition state.

8. The image processing device as claimed in claim 2, wherein the image processing circuit comprises an edge enhancement unit or a sharpening unit configured to enhance or sharpen edges of the first image signal according to the image adjustment parameters.

9. The image processing device as claimed in claim 8, wherein the label generation circuit is configured to generate the different labels for the different categories according to the internal information and the different categories correspond to different edge strengths.

10. The image processing device as claimed in claim 2, wherein the image adjustment parameters are capable to be modified by a user by observing the labeled output image.

11. The image processing device as claimed in claim 1, wherein the second image signal is a YUV signal, and the information label circuit is configured to perform the labeling by modifying a U value and a V value of the YUV signal according to the internal information, respectively, while maintaining a Y value of the YUV signal.

12. The image processing device as claimed in claim 1, wherein the second image signal is a YUV signal, and the information label circuit is configured to perform the labeling by modifying a Y value of the YUV signal according to the internal information, while modifying each of a U value and a V value of the YUV signal to a predetermined value.

13. The image processing device as claimed in claim 1, wherein the second image signal is a RGB signal, and the information label circuit is configure to perform the labeling by modifying each of a R value, a G value and a B value of the RGB signal to a predetermined value, respectively.

14. The image processing device as claimed in claim 1, wherein the information label circuit further comprises:
    a multiplexer circuit, configured to receive the labeled output image and the second image signal and output the labeled output image or the second image signal according to a mode selection signal.

15. An image processing system comprising:
    an image input device, configured to acquire an original image signal and output a first image signal;
    a parameter adjustment device, configured to modify image adjustment parameters;
    an image processing device, configured to receive the first image signal and the image adjustment parameters, wherein the image processing device is configured to process the first image signal according to the image adjustment parameters to generate a second image signal, and label at least one part of the second image signal to generate a labeled output image for demonstrating in real time an adjustment result produced by the image adjustment parameters so as to facilitate modifying the image adjustment parameters; and an image output device, coupled to the image processing device and configured to output the labeled output image having different labels indicating internal information of the image processing device, wherein the image processing device is further configured to categorize the at least one part of the second image signal into different categories, and the different categories is distinguished with each other by using the different labels of the labeled output image.

16. The image processing system as claimed in claim 15, wherein the image processing device comprises:

an image processing circuit, configured to receive the first image signal and the image adjustment parameters and adjust the first image signal according to the image adjustment parameters to output the second image signal; and an information label circuit, coupled to the image processing circuit, and configured to receive the second image signal and the internal information and label the at least one part of the second image signal according to the internal information to generate the labeled output image.

17. The image processing system as claimed in claim 15, wherein the image input device comprises an image sensor.

18. The image processing system as claimed in claim 17, wherein the image input device is configured to read the original image signal from a storage device.

19. An image processing method, comprising:

receiving a first image signal and image adjustment parameters and processing the first image signal by an image processing circuit according to the image adjustment parameters to output a second image signal;

receiving the second image signal and internal information of the image processing circuit and labeling at least one part of the second image signal according to the internal information to generate a labeled output image having different labels indicating the internal information for demonstrating in real time an adjustment result produced by the image adjustment parameters so as to facilitate modifying the image adjustment parameters; and categorizing the at least one part of the second image signal into different categories, wherein the different categories is distinguished with each other by using the different labels of the labeled output image.

20. The image processing method as claimed in claim 19, further comprising:

generating the different labels according the second image signal and the internal information; and overlaying the at least one part of the second image signal with the different labels to generate the labeled output image.

21. The image processing method as claimed in claim 19, wherein the second image signal is a YUV signal, and the labeling is performed by modifying a U value and a V value of the YUV signal according to the internal information, respectively, while maintaining a Y value of the YUV signal.

22. The image processing method as claimed in claim 19 wherein the second image signal is a YUV signal, and a labeling operation of the at least one part of the second image signal is performed by modifying a Y value of the YUV signal according to the internal information, while modifying each of a U value and a V value of the YUV signal to a predetermined value.

23. The image processing method as claimed in claim 19, wherein the second image signal is a RGB signal, and a labeling operation of the at least one part of the second image signal is performed by modifying a R value, a G value and a B value of the RGB signal to a predetermined value, respectively.

24. The image processing method as claimed in claim 19, further comprising:

receiving the labeled output image and the second image signal and outputting the labeled output image or the second image signal according to a mode selection signal.

* * * * *